UNITED STATES PATENT OFFICE.

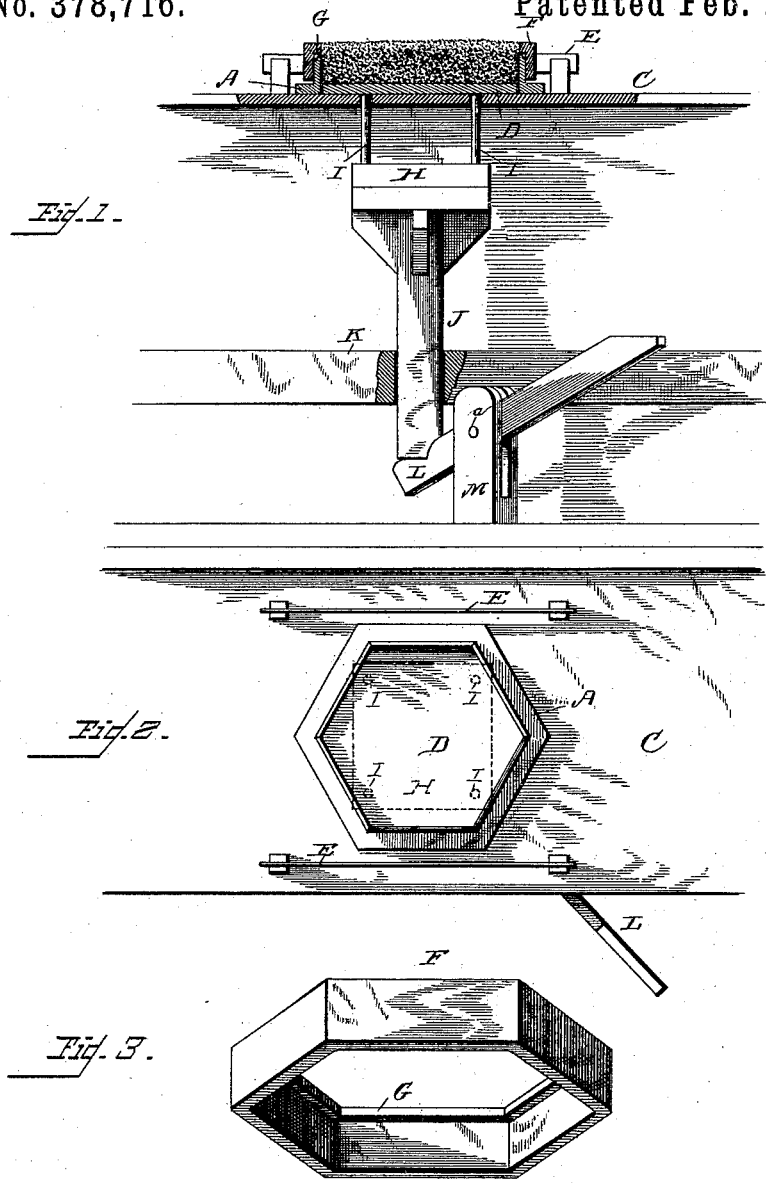

JAMES STANWOOD PEIRCE, OF SAVANNAH, GEORGIA.

MEANS FOR MOLDING ARTIFICIAL-STONE BLOCKS OR TILES FOR PAVING AND OTHER PURPOSES.

SPECIFICATION forming part of Letters Patent No. 378,716, dated February 28, 1888.

Application filed June 6, 1887. Serial No. 240,395. (No model.)

*To all whom it may concern:*

Be it known that I, JAMES STANWOOD PEIRCE, a citizen of the United States, residing at Savannah, in the county of Chatham and State of Georgia, have invented certain new and useful Improvements in Means for Molding Artificial-Stone Blocks or Tiles for Paving and other Purposes; and I do hereby declare the following to be a full, clear, and exact description of the invention, such as will enable others skilled in the art to which it appertains to make and use the same.

My invention relates to improvements in means for molding artificial-stone blocks or tiles for sidewalk and other purposes, whether the block or tile be octagonal, hexagonal, square, or other shape.

The invention has for its object to make a block or tile which will be solid, strong, and hard, with all the parts closely cohering, and not soft and spongy near the surface when taken from the mold.

To the accomplishment of such ends the invention consists in the construction and combination of parts, hereinafter particularly described, and endeavored to be specifically defined by the claims, reference being had to the accompanying drawings, forming a part hereof.

Figure 1 is a side view of the mold and follower and other parts, with parts in section. Fig. 2 is a plan of the same parts. Fig. 3 is a perspective of the rim-cover. Fig. 4 is a perspective of the mold proper.

The composition to compose the block or tile may be of any approved character, and as an illustration I would suggest the composition described in my patent of September 13, 1887, No. 369,959.

In molding the tile, a mold, A, preferably of metal, of hexagonal or other form, is suitably secured upon a table, C, supported in any suitable and well-known manner. Within the mold, and lying upon the table, is a false bottom, D. Along two sides of the mold, and lying parallel with each other upon the table, are the straight-edges E, the top edges of which preferably lie in the same horizontal plane as the top edges of the sides of the mold A. A rim-cover, F, fits around the sides of the mold and is provided with an inwardly-projecting flange, G, which lies over the top edges of the mold and may extend inward from the inside walls of the mold. This rim-cover may be of wood or other material. Beneath the table are provided suitable means for raising the false bottom of the mold. The preferred means are a follower, H, from which extend upwardly a series of pins, I, which pass through corresponding openings in the table and bear against the under side of the false bottom. The beam or shaft J of the follower passes through a cross-beam, K, and at its lower end bears against a foot-lever, L, which is represented as fulcrumed by a pin, *a*, in a post or standard, M. The details of construction of these several parts may be of any approved form, and I do not limit myself to their details of construction. Being provided with the instrumentalities described, the rim-cover F is placed over the mold, the composition placed within the mold, and the same well tamped until the particles are formed into a compact mass. The rim-cover permits the mass up to the top edges of the sides of the mold to be compressed into a firm, solid, and compact mass. The portion, however, from the top of the sides of the mold up to the top of the rim-cover is not so compactly formed—not purposely so, but probably because the pressure is not as constant; but whatever be the cause, it has been observed that when no rim-cover is used the mass is softer or spongy, and not as firm and compact at the surface as below it; hence the employment of the rim, which permits material enough to be used to bring its top surface or layer above the top edges of the mold, so that when the rim-cover is removed a portion of the tile or block is above the sides of the mold. This portion may be more or less; but the thickness of the flange to the rim-cover is preferably such that the portion of the material above the sides of the mold will be two inches in thickness. After the material has been compactly tamped and the rim-cover removed, a straight-edge is run across the block or tile, being guided by the straight-edges E, so as to remove the material that is above the edges of the mold. The material thus removed is what is soft or spongy or not thoroughly compact, and when removed there is left a top surface to the block or tile that is solid and compact. After the surplus material has been removed, a float may be used to smooth the surface, and then the surface may be still further smoothed by means of a trowel, so that it will take a perfect polish. After the surplus material has been taken off and the surface finished, the false bottom, with the tile on it, is lifted by depressing the foot-lever, so as to push up the pins and force out the bottom and tile. The bottom, with the tile on it, is then removed from the pins and placed upon a rack, where it is allowed to stand long enough to thoroughly set and dry—say for the space of three days, (more or less.) After that the tile is removed from the false bottom and watered, and then set out in the yard.

A block or tile prepared by the method described is solid and compact throughout, much stronger and more durable than otherwise, and by the means described can be expeditiously and most satisfactorily made.

I have shown and described what I consider to be the best means of carrying out my invention; but I do not restrict myself to details, as it is apparent that changes can be made without departing from the spirit of my invention.

Having described my invention and set forth its merits, what I claim is—

1. The within-described apparatus for making artificial-stone tiles, the same comprising a mold, A, and a cover, F, to drop around and be lifted from the same, and provided with an inwardly-projecting flange to fit over the top edge of the mold, substantially as and for the purposes described.

2. The within-described apparatus for making artificial-stone tiles, the same comprising a mold, A, a cover, F, to drop around and be lifted from the same, a false bottom to the mold adapted to be removed therefrom, and means for lifting said false bottom, substantially as and for the purposes described.

3. The within-described apparatus for making artificial-stone tiles, the same comprising a mold, A, and straight-edges E on opposite sides of the mold, substantially as and for the purposes set forth.

In testimony whereof I affix my signature in presence of two witnesses.

JAMES STANWOOD PEIRCE.

Witnesses:
  GEO. J. BALDWIN,
  E. F. BRYAN.